(No Model.)
C. N. & N. H. MAXWELL.
GAME APPARATUS.
No. 479,195. Patented July 19, 1892.
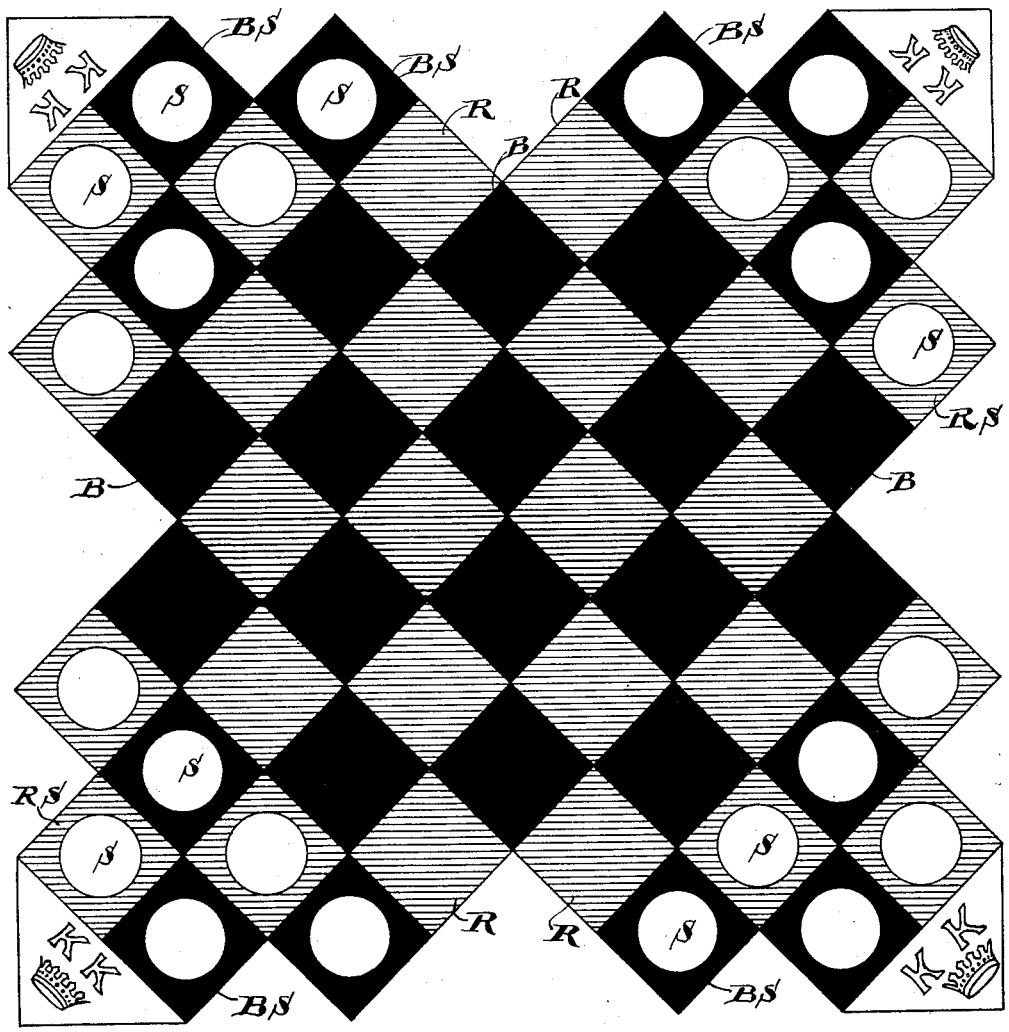
Fig. 1.
Fig. 2.   Fig. 3.
WITNESSES:    INVENTORS
Gideon C. Wilson    Carrie Neff Maxwell
K. Smith            Nathaniel Hamilton Maxwell,
                    by Wm. Hubbell Fisher
                    Their ATTORNEY

UNITED STATES PATENT OFFICE.

CARRIE NEFF MAXWELL AND NATHANIEL HAMILTON MAXWELL, OF CINCINNATI, OHIO.

GAME APPARATUS.

SPECIFICATION forming part of Letters Patent No. 479,195, dated July 19, 1892.

Application filed February 18, 1891. Serial No. 381,777. (No model.)

*To all whom it may concern:*

Be it known that we, CARRIE NEFF MAXWELL and NATHANIEL HAMILTON MAXWELL, citizens of the United States, and residents of the city of Cincinnati, in the county of Hamilton and State of Ohio, have invented certain new and useful Improvements in Game Apparatus, of which the following is a specification.

The several features of our invention and the various advantages resulting from their use, conjointly or otherwise, will be apparent from the following description and claims.

In the accompanying drawings, forming a part of our specification, and to which reference is hereby made, Figure 1 is a plan or top view of a game-board laid off and marked according to our invention. Fig. 2 is view in perspective of one of the movable pieces employed in the game and showing one of the horizontal faces of the said piece. Fig. 3 is a view in perspective of the said movable piece and showing that horizontal face thereof which is underneath and unseen in Fig. 2.

The game is intended for two players, or if more than two persons are playing the game those on one side must act as one person in playing their part of the game. The board consists of a number of squares, and these are located as shown. The general shape given to the laid-off portion of the board by our arrangement of the squares is that of a Greek cross or X. There are in general two main classes of squares, distinguished from one another in any suitable manner. The preferred mode of distinguishing these squares is by painting or otherwise marking one class black and the other red or other color.

On the drawings the entire board is laid out, as indicated by the letter A. The black squares are named by the letter B. The red squares (indicated in the drawings by crosslines) bear the letter R. Besides this general division of squares there is a subdivision or species of squares, which is as follows: Some of the black squares and some of the red squares have a central spot S. This spot is of such a color or marking as to be distinguished from the color or marking of the remainder of the square. In the present illustrative instance the spots are white, and for the sake of imparting a pleasing variety to the square upon which they are located and which they assist to individualize are of a round shape. There are therefore four different kinds of squares located on the gameboard—viz., the black, the red, the black with a central white spot, and the red having a central white spot. For the purposes of identification in this description we have on the drawings indicated the black square with white spot by the characters BS and the red square with white spot by the characters RS.

By the arrangement of the squares on the board there is present at each of the ends of the X or cross-rows of squares consisting of two squares BS and two squares RS one square BS, alternating with a square RS. Beyond these four squares, and forming a part of each end portion of the X or Greek cross, are two squares, one BS and the other RS, located as shown. There is yet another kind of space belonging to this board and forming a part thereof, as follows: At each end of the Greek cross or X is a triangular space. The base of this triangular space lies against the two adjacent end squares—viz., BS and RS. This triangular space is distinguished by some suitable color or mark from the other spaces or squares. In the present illustrative instance each of these spaces is distinguished by the picture of a crown and the letters K K. This triangular space is denominated the "king's corner," by which name the game is to be known. The shape or contour of this space may be altered without deranging its use in the game. With the exception of the king's corners the squares on the board are arranged so that all of the black squares, whether wholly black or black with white spots, shall lie in parallel rows, each point or corner of one of these squares touching the adjacent point of an adjacent square. In like manner all of the red squares and red squares with white spots are so arranged that they lie in rows, squares touching each other, and the adjacent parallel rows of such red squares and red squares with white spots at the points only.

The movable pieces or men with which the game is played are of any suitable description which admits of their being used as men, and when crowned then, as being used either alone or with an addition, as kings. These counters are each indicated by the letter C.

For the purpose of enabling the same movable piece or man to be used as a king we have invented a novel description of movable piece, which latter is as follows: The edges or vertical sides of the counters are either round or formed with faces or sides. The two ends or horizontal faces of each movable piece are differently marked or carved, so as to distinguish one side from the other. For example, one face marked M of the piece C (see Fig. 2) is intended to be employed and be uppermost when the piece is used as a man only, and the face marked K and showing a crown traced thereon is to be employed and be uppermost when the piece is to be used as a king. These movable pieces C are twelve in number, and of these six are of one color and six of a different color or hue or make, so that the one set of six pieces C can be readily distinguished from the other set of six pieces C.

We will now proceed to describe the mode in which the game is played. The players are seated opposite to each other. Each player places his six movable pieces or men, (of one set) with the plain or M face uppermost, on that right-hand corner of the board which is nearest said player. Each of those squares of said corners which are provided with an open disk or spot S receives one of said men C. Thus of the set of movable pieces belonging to a player three will be upon squares BS and three upon squares RS. A move consists in the removal of one piece one square, or in case of jumping, after the first man or king is jumped, such additional squares as the player may choose to move when single intervening spaces occur. All moves must be made to the black squares B, the red squares never being occupied except in the original position and never to be crossed. The men may be moved in all directions, following the black squares, except backward. The player is permitted with the man he is using at one move to jump any number of his own pieces, whether men or kings, and those of his opponent in any direction, except backward, before being crowned; but must permit all pieces so jumped to remain upon the board. A man (movable piece C) having entered a king's corner is crowned, (the movable piece C is turned upside down, so as to bring the crown side K upward.) This crowned piece can then at the pleasure of the player be moved forward or backward, although not permitted to again enter a king's corner after having been once removed from the place of crowning. No option is allowed the player either in the case of a man or king in the matter of jumping his antagonist when the same is possible at the beginning of a move; but after the first man or king is jumped future jumping is entirely optional with the player. Kings only remove the men or kings of an opponent when jumped, the removal in this case being compulsory. The player using the red men R is entitled to the first move in the opening game. The victor in this game is entitled to the first move in the subsequent game. A move having been made and the hand of the player removed from the piece, the decision is final.

The game is won by a player when his antagonist loses all his pieces or his forces are placed in such a position as to render a further movement impossible.

What we claim as new and of our invention, and desire to secure by Letters Patent, is—

1. A game consisting of squares and of the shape of a Greek cross or X, two of the points or corners of the cross being on the line facing the players, each of the arms having the two squares BS and RS standing beyond the rest of said squares BS RS, substantially as and for the purposes specified.

2. In a game-board consisting of squares and in approximately of the shape of an X, part of the squares being of one color or kind, these squares alternating, the end portions of each terminal of the extended corners or ends of the X being provided with similar alternating squares, but these latter squares—viz., BS and RS—being provided with an additional mark or character for distinguishing them from the remainder of the squares, substantially as and for the purposes specified.

3. In a game-board consisting of squares and in approximately of the shape of an X, part of the squares being of one color or kind, these squares alternating, the end portions of each terminal of the extended corners or ends of the X being provided with similar alternating squares, but these latter squares—viz., BS and RS—being provided with an additional mark or character for distinguishing them from the remainder of the squares, there being a row of four of the last-named squares and an outer row of two thereof, substantially as and for the purposes specified.

4. The game-board consisting of alternate squares B and R, differently characterized and arranged in the shape of a Greek cross, and squares BS and RS at the terminal of the cross, having the indicatory disks S, substantially as and for the purposes specified.

5. The game-board having the squares B and R and having its end portions or corners each provided with the squares BS and RS and beyond these with a triangular space K K, substantially as and for the purposes specified.

6. The game-board in the form of a cross, substantially as shown, and having the alternate squares B and R and having its end portions or extended corners provided with a row of four squares BS and RS—viz., two squares BS alternating with two squares RS—and a row of two additional squares, one BS and the other RS, and the outlying spaces K K beyond the last-named row, substantially as and for the purposes specified.

7. The game-board in the form of a Greek cross and provided with squares of two main distinguishing colors, arranged so that all of the squares of one color shall lie in parallel rows, each point or corner of one of these squares touching the adjacent point of an adjacent square, the points or corners of the cross being provided with the spots or spaces K K, respectively located at the ends of the arms and in line with the length of the latter, substantially as and for the purposes specified.

8. A game consisting of squares and of the shape of a Greek cross or X, two of the points or corners of the cross being on the line facing the players, each of the arms having the two squares BS and RS standing beyond the rest of said squares BS RS, a space K K, lying next to and extending out from said two squares BS and RS and forming a narrow or pointed end for the adjacent portion of the cross, substantially as and for the purposes specified.

CARRIE NEFF MAXWELL.
    NATHANIEL HAMILTON MAXWELL.

Attest:
 GIDEON C. WILSON,
 K. SMITH.